(12) United States Patent
Eck et al.

(10) Patent No.: US 8,522,816 B2
(45) Date of Patent: Sep. 3, 2013

(54) DEVICE FOR CONTROLLING FUEL IN A FUEL TANK

(75) Inventors: Karl Eck, Frankfurt (DE); Dieter Hagist, Lahnstein (DE); Matthias Kadler, Gross-Gerau (DE); Martin Maasz, Sulzbach (DE); Oliver Schönert, Arnsberg (DE); Michael Teichert, Schwalbach (DE)

(73) Assignee: Continental Automotive GmbH, Hannover (DE)

( * ) Notice: Subject to any disclaimer, the term of this patent is extended or adjusted under 35 U.S.C. 154(b) by 525 days.

(21) Appl. No.: 12/309,169

(22) PCT Filed: Jul. 9, 2007

(86) PCT No.: PCT/EP2007/056987
§ 371 (c)(1),
(2), (4) Date: Feb. 19, 2009

(87) PCT Pub. No.: WO2008/006807
PCT Pub. Date: Jan. 17, 2008

(65) Prior Publication Data
US 2009/0188574 A1    Jul. 30, 2009

(30) Foreign Application Priority Data

Jul. 11, 2006 (DE) .......................... 10 2006 032 098

(51) Int. Cl.
*B29C 47/68* (2006.01)
*B01D 29/13* (2006.01)
*F02M 37/10* (2006.01)
*F02M 37/14* (2006.01)

(52) U.S. Cl.
USPC ................ 137/545; 137/565.17; 137/565.34; 210/416.4

(58) Field of Classification Search
USPC .... 137/545, 571, 565.17, 565.34; 210/416.4; 123/509
See application file for complete search history.

(56) References Cited

U.S. PATENT DOCUMENTS

| | | | |
|---|---|---|---|
| 5,809,975 A * | 9/1998 | Tuckey et al. | 123/509 |
| 6,287,456 B1 * | 9/2001 | Fish et al. | 210/85 |
| 6,478,014 B1 * | 11/2002 | Kohlhaas | 123/509 |
| 6,551,509 B2 | 4/2003 | Appleton | |
| 6,739,354 B2 | 5/2004 | Oku et al. | |
| 6,929,742 B2 * | 8/2005 | Wehrum et al. | 210/257.1 |
| 7,069,913 B1 * | 7/2006 | Crary | 123/509 |
| 7,082,931 B2 * | 8/2006 | Sinz | 123/509 |
| 7,182,869 B2 | 2/2007 | Catlin et al. | |
| 2002/0153300 A1 | 10/2002 | Appleton | |
| 2002/0166809 A1 | 11/2002 | Wehrum et al. | |

(Continued)

FOREIGN PATENT DOCUMENTS

| | | |
|---|---|---|
| DE | 195 13 414 A1 | 10/1996 |
| DE | 196 15 081 A1 | 10/1997 |

(Continued)

*Primary Examiner* — Craig Schneider
*Assistant Examiner* — Atif Chaudry
(74) *Attorney, Agent, or Firm* — Cozen O'Connor

(57) ABSTRACT

A device for collecting fuel in a fuel tank of a motor vehicle having a prefilter arranged inside a swirl pot. The prefilter has a section rising from a horizontal plane and a section lying in the horizontal plane. The sections of the prefilter are produced as one piece and are connected to the swirl pot. The prefilter has an especially large surface.

9 Claims, 4 Drawing Sheets

(56) References Cited

U.S. PATENT DOCUMENTS

| | | |
|---|---|---|
| 2003/0071146 A1 | 4/2003 | Yamada |
| 2004/0050370 A1 | 3/2004 | Deichmann et al. |
| 2004/0109773 A1 | 6/2004 | Mashimo et al. |
| 2006/0011172 A1 | 1/2006 | Kadler et al. |
| 2006/0076287 A1* | 4/2006 | Catlin et al. ............... 210/416.4 |
| 2006/0112937 A1 | 6/2006 | Tittmann |
| 2007/0084784 A1 | 4/2007 | Wehrum |

FOREIGN PATENT DOCUMENTS

| | | |
|---|---|---|
| DE | 10004357 A1 | 8/2001 |
| DE | 101 18 050 A1 | 10/2002 |
| DE | 10315235 A1 | 10/2003 |
| DE | 10340246 B3 | 3/2005 |
| DE | 10 2004 007 718 A1 | 10/2005 |
| DE | 102005047470 A1 | 4/2006 |
| EP | 1 619 065 A1 | 1/2006 |
| JP | 56-120356 U | 9/1981 |
| JP | 2003-193929 A | 7/2003 |
| JP | 2003-521632 A | 7/2003 |
| JP | 2004-190491 A | 7/2004 |
| JP | 2004-521231 A | 7/2004 |
| KR | 1998-0008578 U | 4/1998 |
| KR | 2003-0092047 A | 12/2003 |
| WO | WO 02/20974 A1 | 3/2002 |
| WO | WO 02/084100 A1 | 10/2002 |
| WO | WO 2004/113111 A1 | 12/2004 |
| WO | WO 2005/051699 | 6/2005 |
| WO | WO 2005/051699 A1 | 6/2005 |

\* cited by examiner

DEVICE FOR CONTROLLING FUEL IN A FUEL TANK

PRIORITY CLAIM

This is a U.S. national stage of application No. PCT/EP2007/056987, filed on Jul. 9, 2007, which claims Priority to the German Application No. 10 2006 032 098.0, filed: Jul. 11, 2006; the contents of both being incorporated herein by reference.

BACKGROUND OF THE INVENTION

1. Field of the Invention

The invention relates to a device for collecting fuel in a fuel tank of a motor vehicle, having a surge pot, having a suction connection for a fuel pump and having a pre-filter which covers the suction connection.

2. Description of the Prior Art

Devices of said type are often used in modern fuel tanks and are known from practice. The pre-filter is often designed as a component which is flat in its basic state and which nestles against the contours of the device in the mounted position. A fuel pump which is arranged in the surge pot sucks fuel through the pre-filter.

SUMMARY OF THE INVENTION

A disadvantage of the known device is that the pre-filter is a component which must be mounted in a complex manner. Furthermore, the useful filter surface of the pre-filter is restricted by the nestling against the components of the device.

The invention is based on the problem of refining a device of the type specified in the introduction in such a way that said device is particularly simple to assemble and that the pre-filter has a large filter surface.

According to one embodiment of the invention, the pre-filter is arranged within a swirl pot, referred to as the surge pot, and has a section which projects from a horizontal plane.

By means of said design, the pre-filter is arranged in the surge pot and can therefore be pre-assembled with the latter. Said design also serves to prevent the pre-filter from nestling against other components of the device according to one embodiment of the invention, and filter surface thereby being lost. The pre-filter therefore has a particularly large filter surface. One advantage of the arrangement of the pre-filter with a section which deviates from the horizontal plane is that dirt is rinsed from the pre-filter by sloshing movements of the fuel. The influence of dirt on the useful filter surface of the pre-filter is thereby kept low.

The assembly of the device according to one embodiment of the invention is particularly cost-effective if the pre-filter is held with its edges on the wall of the surge pot. As a result of the edges of the pre-filter being held on the wall of the surge pot, the pre-filter is situated in its intended position throughout the further assembly of the surge pot with further components of a feed unit. The pre-filter is hereby prevented from nestling against adjacent components of the device according to the invention.

According to another embodiment of the invention, the production of the surge pot with the pre-filter is particularly cost-effective if the pre-filter is at least partially cohesively connected to the surge pot. In the simplest case, the pre-filter is an insert part which is inserted into an injection mold of the surge pot and which is cohesively connected to the surge pot during the injection-molding process.

To reduce the number of components of the device according to one embodiment of the invention, it is expedient if the pre-filter and the surge pot are produced in one piece. By means of said design, the pre-filter is produced during the production of the surge pot. Opposing molds of the surge pot may have a multiplicity of individual contact points which, after the production of the surge pot, form the individual openings of the pre-filter.

The device according to one embodiment of the invention is of particularly compact design if the surge pot has a casing and if the pre-filter is connected to the casing.

The device according to one embodiment of the invention is of particularly simple structural design if a collecting chamber is arranged between the pre-filter and a base plate which is sealingly connected to the casing, and if a suction connection of the fuel pump protrudes into the collecting chamber.

At least in the new state of the device according to one embodiment of the invention, the pre-filter has a particularly large filter surface if the pre-filter has a horizontal section.

To further reduce the number of components to be assembled in the device according to one embodiment of the invention, it is expedient if the horizontal section and that section of the pre-filter which projects from the horizontal plane are produced in one piece.

The section which projects from the horizontal plane could for example taper obliquely in the direction of the casing. However, according to another advantageous refinement of the invention, particularly reliable cleaning of the pre-filter by sloshing movements in the surge pot can be generated in a simple manner if the section which projects from the horizontal plane is arranged vertically in the surge pot.

BRIEF DESCRIPTION OF THE DRAWINGS

The invention permits numerous embodiments. To further illustrate the basic principle of the invention, two of said embodiments are illustrated in the drawing and described below. In the drawing.

DETAILED DESCRIPTION OF THE PRESENTLY PREFERRED EMBODIMENTS

Figure 1:
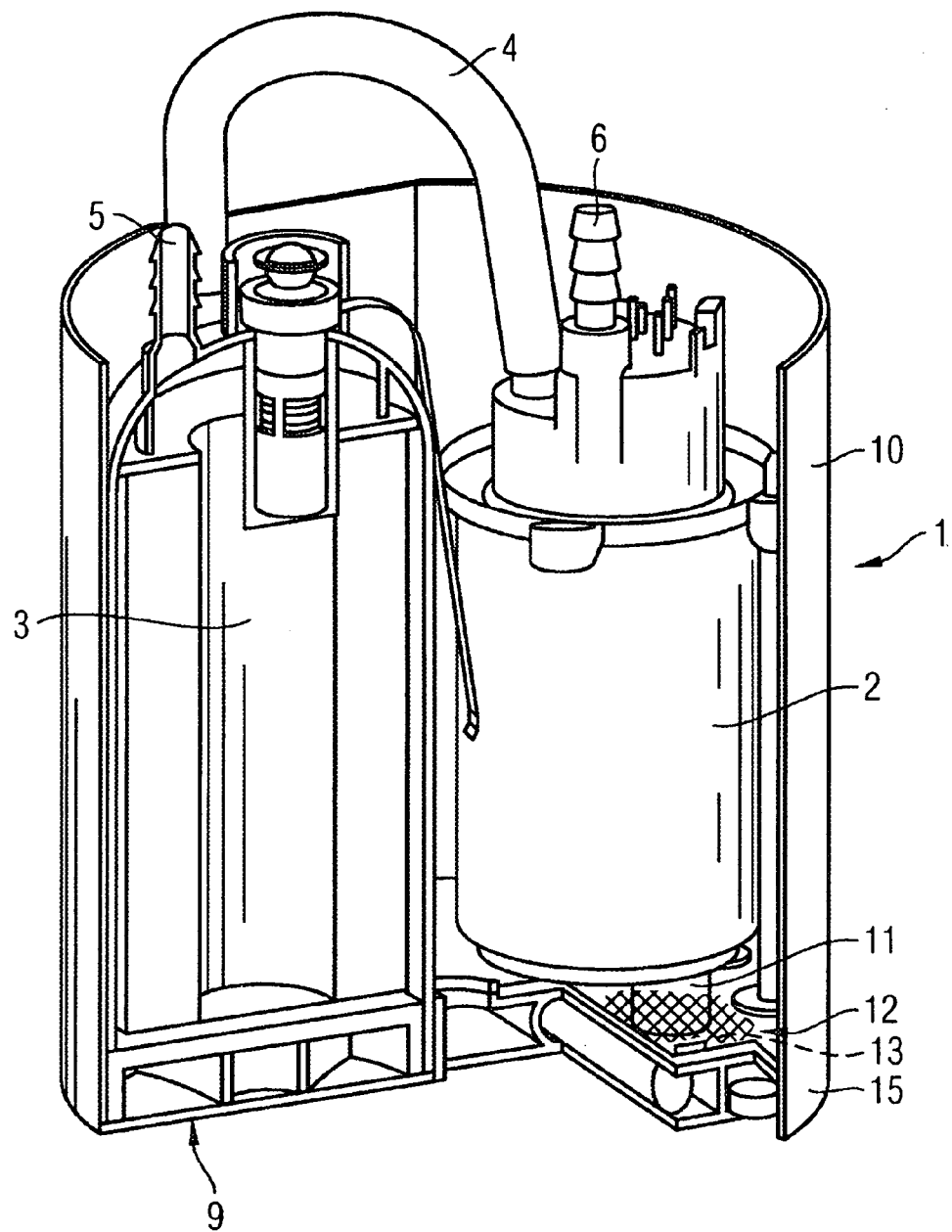
FIG. 1 is a partial section through a device according to the invention for collecting fuel.
Figure 2:
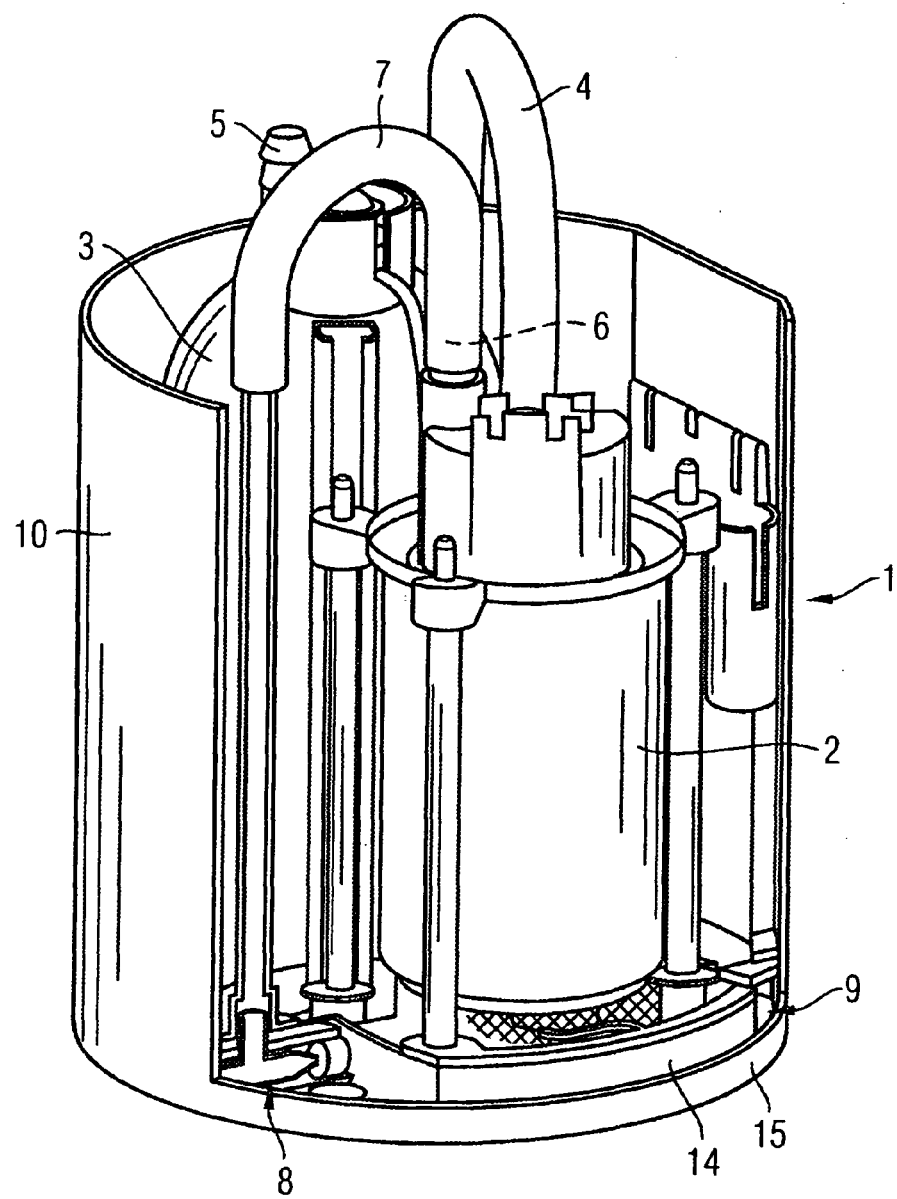
FIG. 2 is a second partial section, which is offset in relation to the partial section from FIG. 1, of the device according to the invention.

FIG. 1 shows a device for collecting fuel in a fuel tank of a motor vehicle and for feeding the collected fuel to an internal combustion engine (not illustrated) of the motor vehicle. The device has a fuel pump 2 which is driven by an electric motor and which is arranged in a surge pot 1, and a fine-mesh filter 3. The fine-mesh filter 3 is likewise arranged in the surge pot 1 and is connected by means of a fuel line 4 to the fuel pump 2. Furthermore, the fine-mesh filter 3 has a connecting pipe 5 for a feed line (not illustrated) which leads to the internal combustion engine of the motor vehicle. A line 7 (illustrated in FIG. 2) for a suction jet pump 8 is connected to a connection 6 of the fuel pump 2. The suction jet pump 8 sucks in fuel from the surroundings of the surge pot 1 and feeds said fuel into the surge pot 1. The surge pot 1 serves to collect the fuel and has a base plate 9 and a casing 10 which is sealingly connected to the base plate 9. A suction pipe 11 of the fuel pump 2 extends through a pre-filter 12 into a collecting chamber 13. The collecting chamber 13 is delimited by the base plate 9 and the pre-filter 12. Fuel flowing into the surge pot 1 passes via the pre-filter 12 into the collecting chamber 13 and therefore to the suction pipe 11 of the fuel pump 2. The fuel pump 2 can therefore suck in fuel from the surge pot 1 and feed said fuel via the fine-mesh filter 3 to the connecting pipe 5 for the feed line. The casing 10 of the surge pot 1 has an edge 15 which engages over a supporting edge 14 of the base plate 9. The edge 15 and the supporting edge 14 are sealingly connected to one another.

Figure 3:
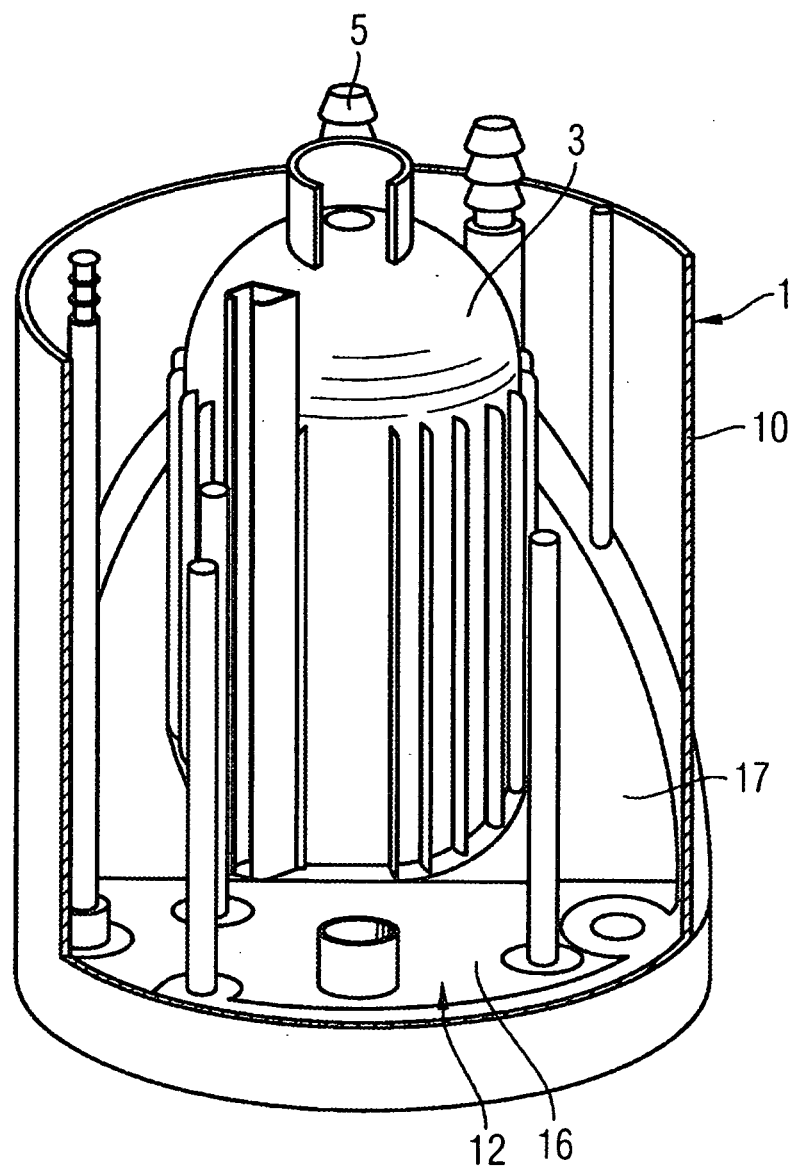
FIG. 3 is perspective illustration of a surge pot of the device according to the invention, with a pre-filter, in partial section.

FIG. 3 shows the surge pot 1 from FIG. 1 in a partial section. It can be seen here that the pre-filter 12 has a horizontal section 16 and a section 17 which projects from the horizontal plane, and is cohesively connected to the casing 10 of the surge pot 1. The pre-filter 12 is produced in one piece and is encapsulated, by injection molding, with plastic of the surge pot 1. That section 17 of the pre-filter 12 which projects from the horizontal plane is inclined with respect to the vertical.

Figure 4:
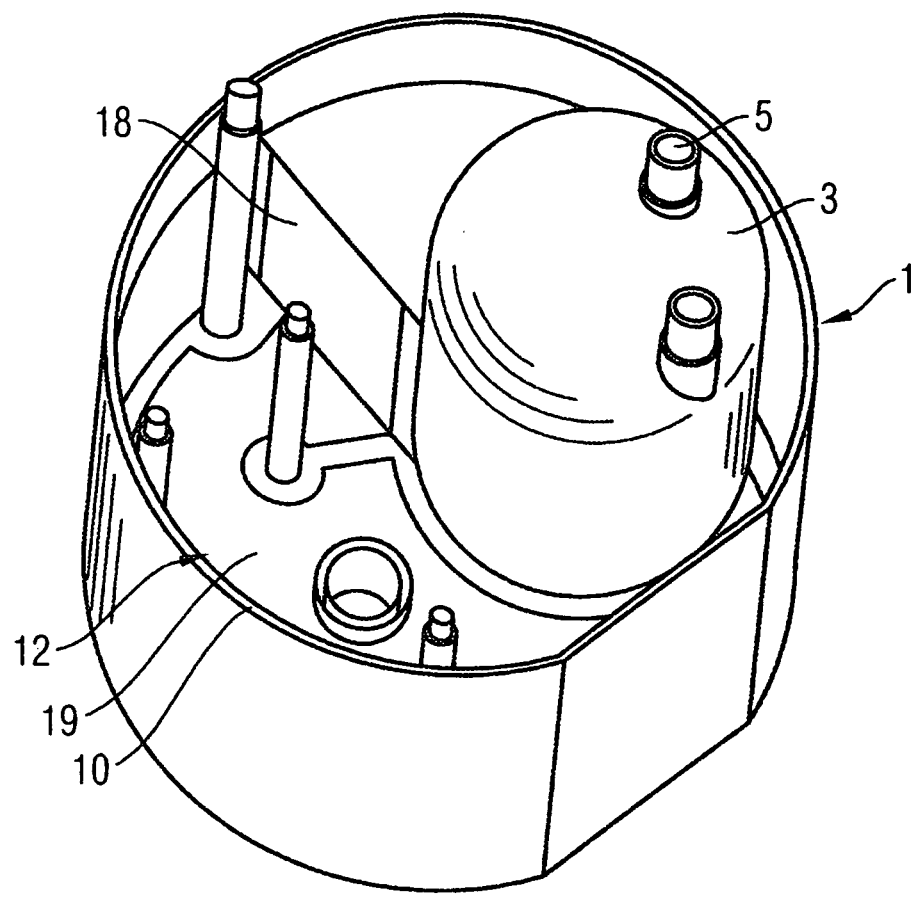
FIG. 4 is further embodiment of the swirl pot in a perspective illustration.

FIG. 4 shows a further embodiment of the surge pot 1 which differs from that in FIG. 3 merely in that the pre-filter 12 has a vertical section 18 which adjoins a horizontal section 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for collecting fuel in a fuel tank of a motor vehicle, comprising:
   a swirl pot having a base plate and a wall extending from the base plate;
   a fuel pump having a suction input connection arranged in the swirl pot;
   a pre-filter arranged in the swirl pot and having at least one portion that projects at an angle greater than zero from a horizontal plane, wherein the pre-filter is retained by its edges on the wall of the swirl pot and the suction input connection extends through the pre-filter into a collecting chamber delimited by the pre-filter and the base plate; and
   a fine filter fluidically arranged at an output of the fuel pump.

2. The device according to claim 1, wherein the pre-filter is at least partially connected to the swirl pot.

3. The device according to claim 1, wherein the pre-filter and the swirl pot are produced as a single piece.

4. The device according to claim 1, wherein the swirl pot has a casing and the pre-filter is connected to the casing.

5. The device according to claim 1, wherein the pre-filter has a horizontal section.

6. The device according to claim 5, wherein the horizontal section and the least one portion that projects from the horizontal plane of the pre-filter are produced as a single piece.

7. The device according to claim 1, wherein the pre-filter portion that projects at an angle from the horizontal plane is arranged vertically in the swirl pot.

8. The device according to claim 1, wherein the pre-filter portion that projects at an angle from the horizontal plane is arranged at an oblique angle to the horizontal plane vertically in the swirl pot.

9. The device according to claim 1, wherein the fine filter is arranged in the swirl pot.

* * * * *